United States Patent
Shun'ko

Patent Number: 6,036,410
Date of Patent: Mar. 14, 2000

[54] TIP PORTION OF THE DRILL BIT

[76] Inventor: Evgeny V. Shun'ko, 735 Loretta St., Pittsburgh, Pa. 15217

[21] Appl. No.: 08/908,651

[22] Filed: Aug. 7, 1997

Related U.S. Application Data

[63] Continuation-in-part of application No. 08/364,554, Dec. 27, 1994, abandoned.

[51] Int. Cl.$^7$ .................................................. B23B 51/02
[52] U.S. Cl. ...................................... 408/230; 408/227
[58] Field of Search .................................. 408/227, 229, 408/230

[56] References Cited

U.S. PATENT DOCUMENTS

| | | | |
|---|---|---|---|
| 1,467,491 | 9/1923 | Oliver | 408/230 |
| 4,222,690 | 9/1980 | Hosoi | 408/230 |
| 5,590,987 | 1/1997 | Bouzounie | 408/230 |

*Primary Examiner*—Daniel W. Howell
*Attorney, Agent, or Firm*—Carothers & Carothers

[57] ABSTRACT

The present invention pertains to a drill bit tip portion (3) comprising a drill bit body having an axis of symmetry (1). The drill bit body having lands (2) symmetrically displaced around the symmetry axis (1) has axial clearance faces (6) forming main cutting edges (5) and back edges (7). The main cutting edges (5) are connected with axial rake faces (4). The axial clearance faces (6) are crossed beginning from the axial rake faces (4) throughout the back edges (7) till the drill apex (9) by the oval cross section grooves (10) forming symmetrically central cutting edges (11). The central cutting edges (11), being connected to one another at a drill apex (9), are connected to corresponding main cutting edges (5). The corresponding surfaces of the grooves (10) are smoothly connected with the axial rake faces (4), and the central cutting edges (11) are smoothly connected with the corresponding main cutting edges. Therefore a rake angle is conserved from a vicinity of those connections till the drill bit apex (9) at the condition of the groove cross section invariability. In this manner, the central cutting edges (11) are an extension of the lips (5) to the drill apex.

2 Claims, 4 Drawing Sheets

TIP PORTION OF THE DRILL BIT

CROSS REFERENCE

This application is a continuation-in-part of U.S. patent application Ser. No. 08/364,554, filed Dec. 27, 1994, now abandoned.

The present invention is related, in general, to a drill bit tip portion. More specifically, the present invention is related to a drill bit tip portion having two oval cross section grooves crossing symmetrically the axial clearance faces from the axial rake faces toward the apex of the drill bit. This crossing forms central cutting edges extending lips to the drill bit apex.

BACKGROUND OF THE INVENTION

Practice of a drilling process by a conventional drill bit has shown that a chisel terminating the web of the drill bit (see FIG. 2) at the apex of a drill bit tip portion hampers a drilling process due to high resistance of a drilled material against this chisel penetration. This effect occurs due to crumpling the drilled material by the chisel 8 (FIG. 2) having negative rake angles. This problem has been overcome in a prior art drill bit tip portion shaped by two symmetrical recessions having only one common point at the drill apex (see FIG. 3). However a sharp shape of this recession corners, which are shaped through the web, promotes a brake of shaving and a further corner obstruction by pressed shaving and dust of a material drilled. This effect reduces a drill bit tip portion shown in FIG. 3 to the shape of the conventional drill bit shown in FIG. 2 at certain modes of a drilling process.

The present invention enables one to overcome this problem by forming two symmetrically displaced oval cross section grooves shaped across axial clearance faces from axial rake faces toward the apex of the drill bit (FIG. 1). The cross section of these grooves with the axial clearance faces forms extension of lips toward the drill bit apex. This extension including point at a drill apex (FIG. 1(a)) have a positive rake angle at certain conditions, and it could be considered as central cutting edges. The oval cross section of the grooves promotes bending and twist of a shaving to a conic-spiral shape which provides easy evacuation of a shaving from the grooves.

SUMMARY OF THE INVENTION

The present invention pertains to a drill bit tip portion 3 (FIG. 1) comprising a drill bit body having an axis of symmetry 1 (FIG. 1). The drill bit body having lands 2 symmetrically displaced around the symmetry axis 1 has axial clearance faces 6 forming main cutting edges (lips) 5 and back edges 7 (see FIG. 1). The main cutting edges 5 are connected with axial rake faces 4. The axial clearance faces 6 are crossed by oval cross section grooves 10 beginning from the axial rake faces 4 toward the drill apex 9 and forming symmetrically central cutting edges 11. Thus the central cutting edges 11 being connected to one another at a drill bit apex 9, are extension of the lips 5 to the drill bit apex 9. The corresponding surfaces of the grooves 10 and, consequently, the central cutting edges 11 have smooth connections with the axial rake faces 4 and with the lips 5 respectively, that provides possibility to have a positive rake angle from those connection vicinities till a drill apex 9.

BRIEF DESCRIPTION OF THE DRAWINGS

In accompanying drawings, the preferred embodiment of the invention is illustrated in which.

DESCRIPTION OF THE PREFERRED EMBODIMENT

Figure 1:
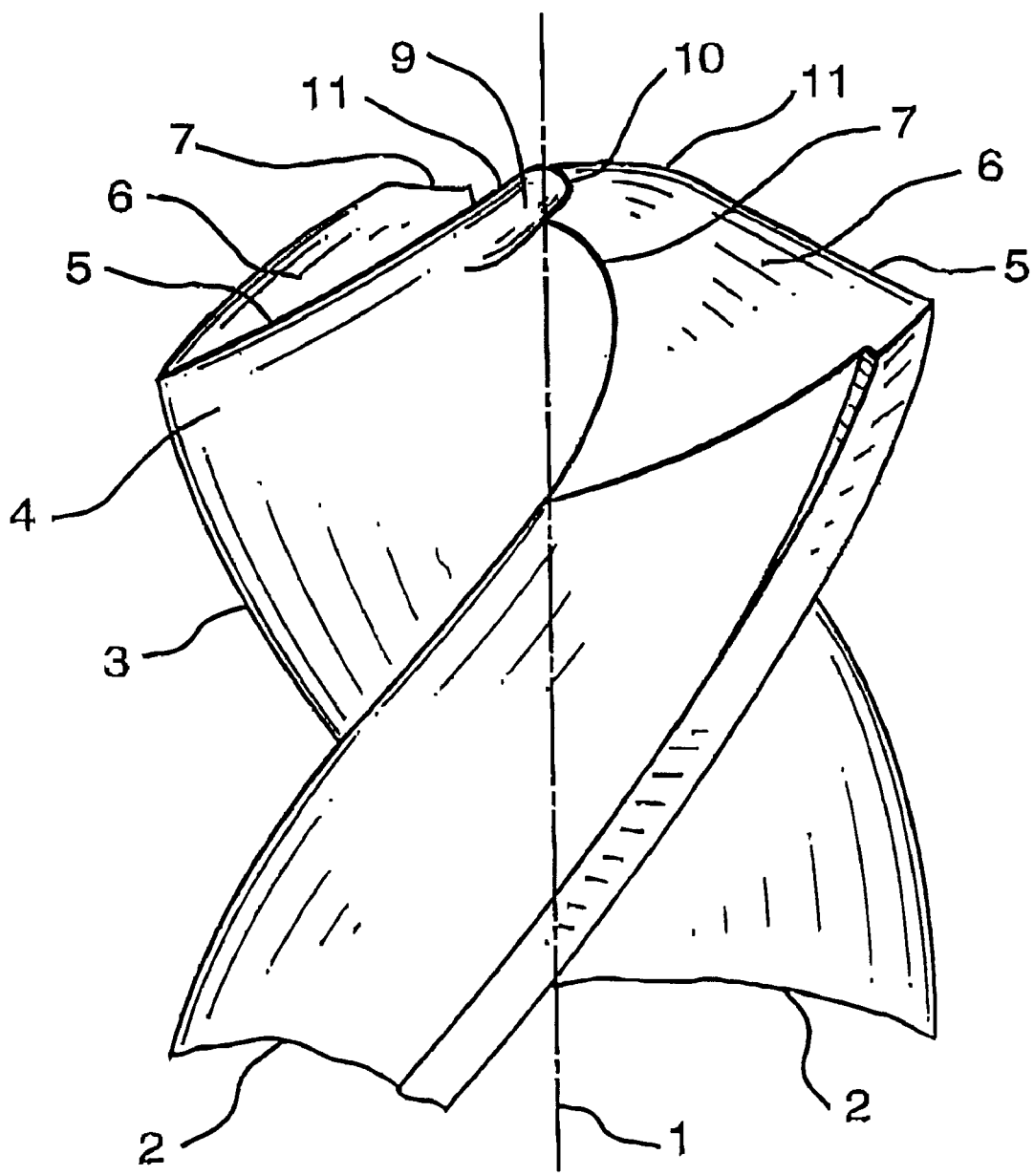
FIG. 1 is a schematic representation showing a perspective view of the drill bit tip portion.
Figure 1A:
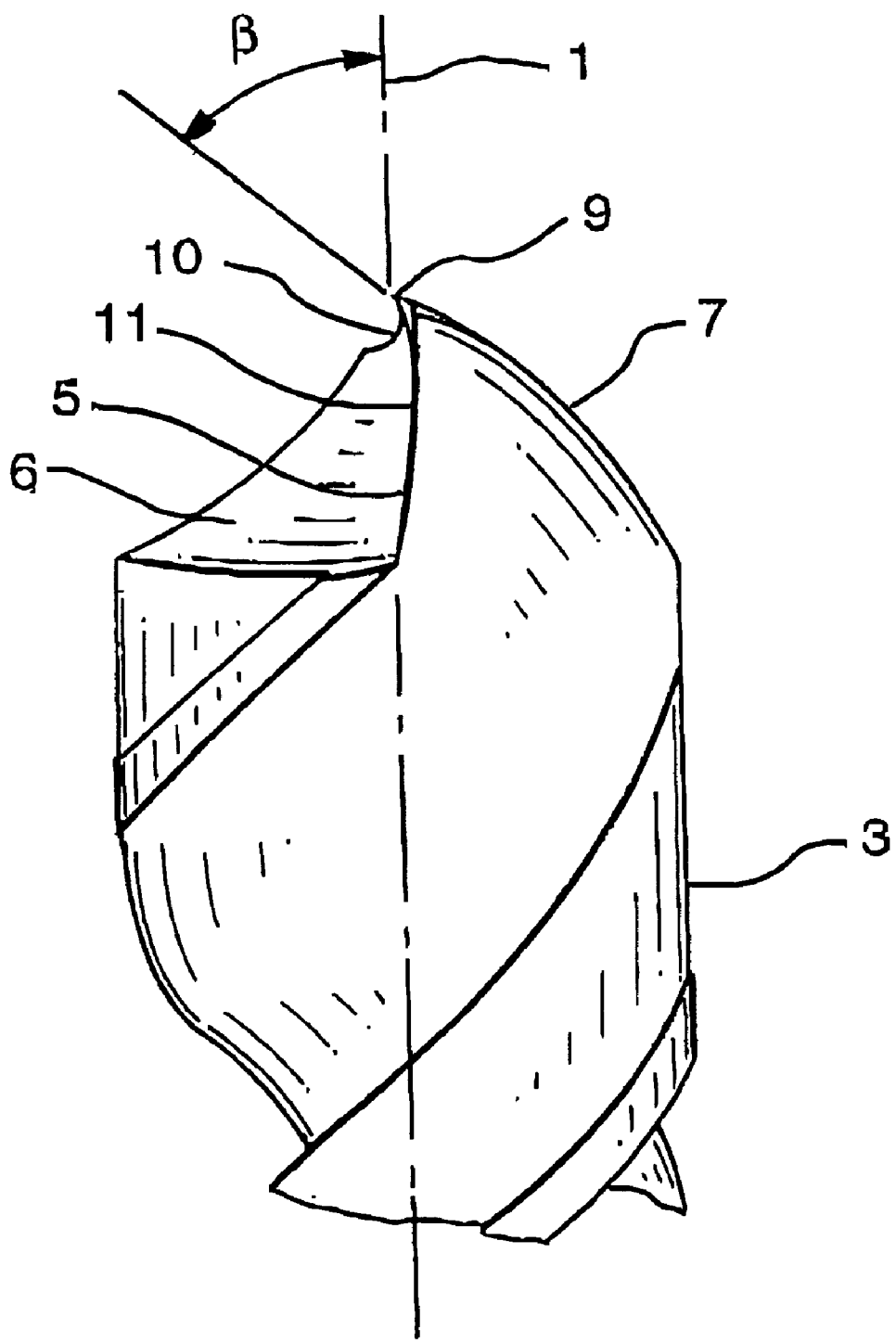
FIG. 1(a) is a schematic representation showing a perspective view of the drill bit tip portion in the projection along the groove 10 shown in FIG. 1.

Referring to the drawings, wherein like reference numerals refer to similar or identical parts throughout the perspective views, and more specifically to FIGS. 1 and 1(a) thereof, there is shown the drill bit tip portion comprising a drill bit body 3 having a symmetry axis 1 (FIG. 1). The drill bit body 3 having lands 2 displaced symmetrically around the axis of the symmetry 1 has axial clearance faces 6 forming main cutting edges (lips) 5 and back edges 7. The lips 5 are connected with axial rake faces 4. The axial clearance faces 6 are crossed by the oval cross section grooves 10 beginning from axial rake faces 4 toward the drill bit apex 9 and forming symmetrically central cutting edges 11. The central cutting edges 11 are connected to one another at the drill bit apex 9, and they are extension of the lips 5 toward the apex 9 of the drill bit. The corresponding surfaces of the grooves 10 are smoothly connected with the axial rake faces 4, and the central cutting edges 11 are smoothly connected with the corresponding main cutting edges 5 thereof. The oval cross section of the grooves 10 as well as smooth connection of the groove surfaces with the axial rake faces 4 provides homogeneous bending and twist of the drilled material shaving to a conic-spiral shape promoting a fast and easy evacuation of the shaving from the grooves 10. The oval cross section of the grooves 10 as well as smooth connection of the groove surfaces with the axial rake faces 4 enable one also obtain positive rake angle (angle β, see FIG. 1(a)) along extended lips 5 including central cutting edges 11 and point 9 at the drill bit apex, which provides homogeneous physical conditions for cutting process. Indeed, the corresponding surface of the groove 11 is tangent to the axial rake face 4 in the vicinity of the lip 5 and the central cutting edge 11 connection due to their smooth continual connection, see FIG. 1. Thus one can expect the conservation of the rake angle from this vicinity till the drill apex 9 under the condition of the groove 10 cross section conservation (see FIGS. 1, 1(a)). As the consequence, the resharpen ability of the drill bit is 100% because of the rake angle is not more than the helix angle in this case by the geometrical definition. Therefore the grooves 10 (FIG. 1) can be obtained by grinding procedure using a spinning abrasive disc having rounded edge. In the preferred embodiment, the grooves 10 have permanent cross section. The smooth continual connection of central cutting edges 11 with main cutting edges 5 assumes a corresponding decrease in a height of a drill bit tip portion from the apex 9 toward a periphery of the central part. This decrease provides a stable position of a drill bit on a surface of a drilled material at the start of a drilling process. This additional positive effect of the present invention enables one to exclude a preliminary use of a center drill from the drilling process in certain cases.

Figure 2:
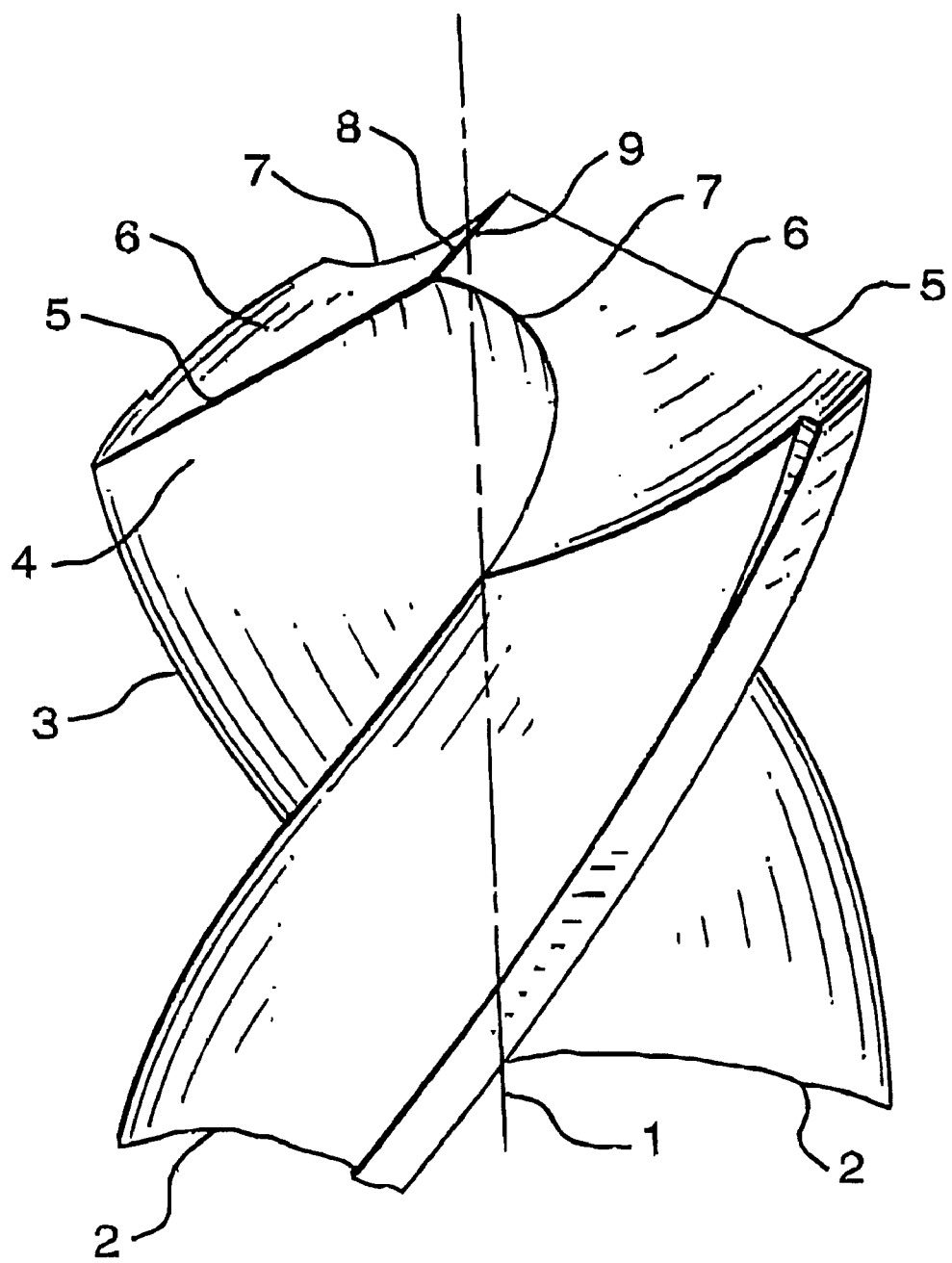
FIG. 2 is a schematic representation showing a typical prior art drill bit.
Figure 3:
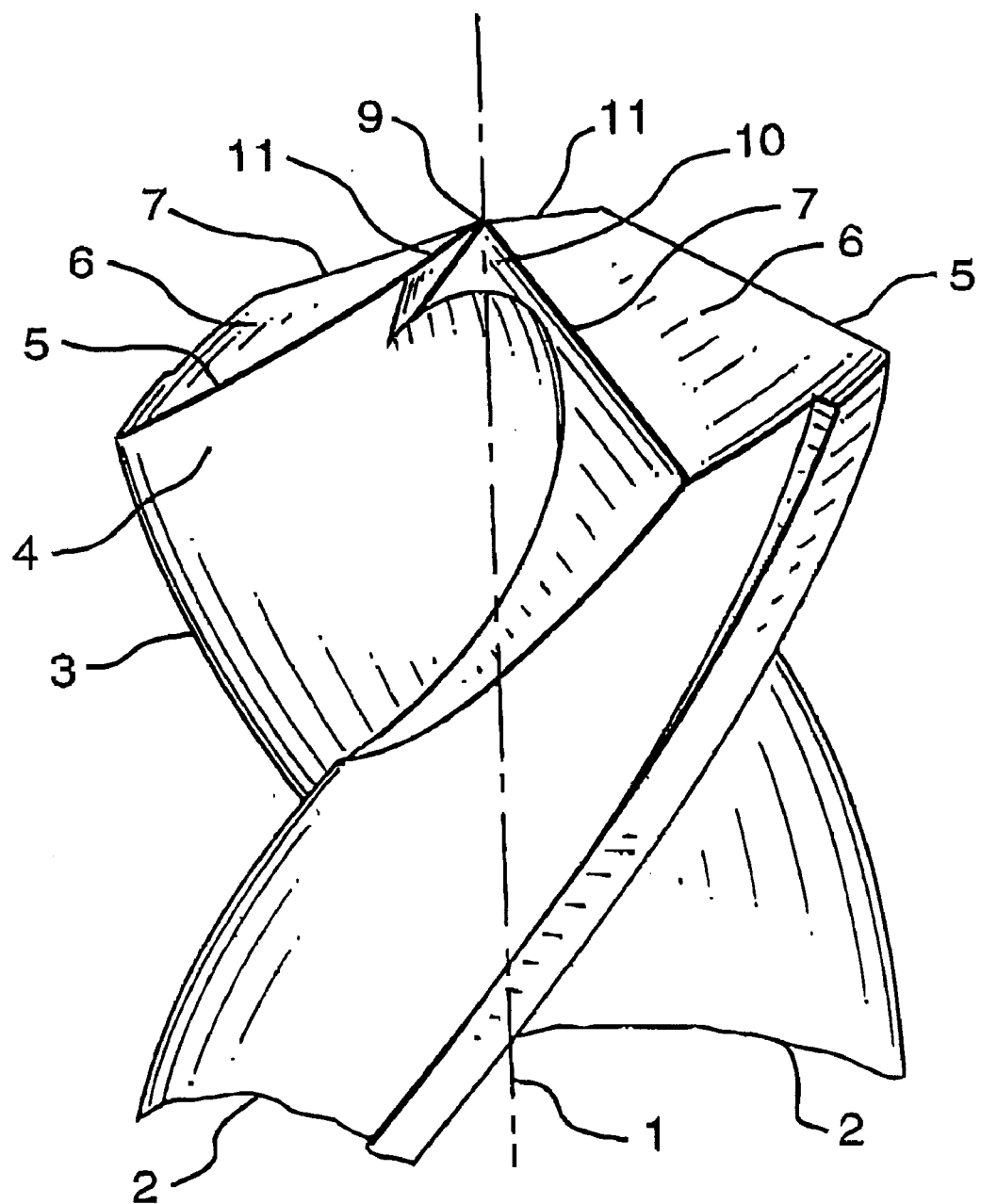
FIG. 3 is a schematic representation showing a prior art drill bit.

This stands in a direct contrast to a typical prior art drill bit (FIG. 2) having a chisel 8 at a drill bit apex 9, since cross section of the axial clearance faces 6 forming this chisel 8 can provide only negative rake angles for this chisel 8 for any reasonable drill bit design. And this stands in contrast to a prior art drill bit shown in FIG. 3 and having two symmetrical recessions 10 forming central cutting edges 11 in the vicinity of the drill bit web. The sharp shape of these recession corners promotes a sharp premature brake of a shaving and further obstruction of the comers of these recessions by a pressed broken shaving and a drilled material dust, which reduces a drill bit tip portion shown in FIG. 3 to the shape of a conventional drill bit shown in FIG. 2. This effect is especially strong for drill bits having the small diameters <¼". Besides that, the shape of the recessions 10 (FIG. 3) assumes in particular case a formation of the central cutting edges 11 from a chisel 8 (FIG. 2) of a conventional drill bit. Taking into account that the shape of the chisel 8 (FIG. 2) of a conventional drill bit has a slight deviation from the straight line, one can see that a prior art drill bit tip portion shown in FIG. 3 has a slight improvement in stability of the drill tip position on the surface of a material drilled in comparison with a tip portion of a conventional drill bit shown in FIG. 2.

What is claimed is:

1. A drill bit tip portion having a longitudinal axis of symmetry with lands symmetrically displaced around said axis and having axial clearance faces forming main cutting edges and back edges on said lands, said main cutting edges connecting at a web with respective centrally located central cutting edges having their only common point at a drill apex on said axis; the improvement comprising: said central cutting edges being formed by oval cross section grooves crossing said axial clearance faces from said back edges to said drill apex and said grooves smoothly converging with said axial rake faces, and said central cutting edges smoothly connecting with said main cutting edges to have a continuous positive rake angle along said central cutting edges.

2. A drill bit tip portion as defined in claim 1 wherein said grooves have a slight curvature around said axis of symmetry.

\* \* \* \* \*